United States Patent
Torio et al.

(10) Patent No.: US 11,537,094 B2
(45) Date of Patent: Dec. 27, 2022

(54) CLOUD-HOSTED INTERFACE FOR PORTABLE DEVICE COMMUNICATORS

(71) Applicant: FISHER-ROSEMOUNT SYSTEMS, INC., Round Rock, TX (US)

(72) Inventors: Michelle Diane Bautista Torio, Manila (PH); Jasmin Velasco Alcazaren, Imus Cavite (PH)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 117 days.

(21) Appl. No.: 16/792,576

(22) Filed: Feb. 17, 2020

(65) Prior Publication Data
US 2021/0255596 A1 Aug. 19, 2021

(51) Int. Cl.
G05B 19/042 (2006.01)

(52) U.S. Cl.
CPC ........... *G05B 19/0426* (2013.01); *G05B 2219/25066* (2013.01); *G05B 2219/25124* (2013.01)

(58) Field of Classification Search
CPC ...... G05B 19/0426; G05B 2219/25124; G05B 2219/25066
See application file for complete search history.

(56) References Cited

U.S. PATENT DOCUMENTS

| | | | |
|---|---|---|---|
| 10,909,137 B2 * | 2/2021 | Blevins | G06F 16/254 |
| 2018/0101152 A1 * | 4/2018 | Jundt | G05B 19/041 |

FOREIGN PATENT DOCUMENTS

| | | |
|---|---|---|
| GB | 2 403 042 A | 12/2004 |
| GB | 2 552 419 A | 1/2018 |
| GB | 2 556 200 A | 5/2018 |

OTHER PUBLICATIONS

Search Report for Application No. GB2101892.4, dated Jun. 1, 2021.

* cited by examiner

*Primary Examiner* — Mohammad Ali
*Assistant Examiner* — Sheela Rao
(74) *Attorney, Agent, or Firm* — Marshall, Gerstein & Borun LLP

(57) ABSTRACT

A system for sharing plant device configuration data collected by handheld communicators during monitoring and servicing activities. Plant device configuration data is assigned relational identifiers such as equipment identifiers that provide additional information relevant to the configuration data for a plant device. Additional plant process identifiers may also be assigned to distinguish configuration profiles for various equipment sets. The relational data may be used to retrieve the configuration profiles for application in various efforts to replicate configurations across plants.

26 Claims, 11 Drawing Sheets

Device Configuration

Tag: PT-101 — 310
Device Type: 3051 — 312
Manufacturer: Rosemount
114 Variables
Printed on: 9/14/2017 10:23:03 PM

300

| Parameter | Value |
|---|---|
| # of Remote Seals | None |
| (150:Variable) | 16 - Unknown Enum... |
| (152:Variable) | 0x00 |
| Alarm Direction | High |
| Alarm/Sat Type | User |
| Alert Mode | Off |
| Analog Output | 4.001 |
| BurstMode | On |
| Burst Option | ***** |
| Calibration Type | Diff (DP) |
| CM Lower Value | 0.0000 |
| CM Units | DEFLT |
| CMUpper Value | 0.9999 |
| CM xf fnct | Linear |
| CMV | 0.0000 |
| Date | 5/10/2013 |
| Description | SYNC |
| Dev flags | 0x00 |
| Device Status | 0x40 |
| Distributor | Rosemount |
| Drain Vent Material | 316 SST |
| Electronics S/N | 6613968 |
| Fact trm recal loc | ***** |
| Field Device Revision | 7 |
| High Alarm | Silicone oil |
| High Alarm | 16 |
| High Alert Value | 23.00 |
| High Alert Value | 23.00 |
| High Sat | 7.212 |
| High Saturation | 80.0 |
| Isolator Material | 20.80 |
| Local ZERO / SPAN... | 20.80 |
| Low Alarm | 316 SST |
| Low Alarm | Enable |
| Low Alert Value | 3.73 |
| Low Alert Value | 3.73 |
| Low Sat | -0.014 |
| Low Saturation | -40.0 |

| Parameter | Value |
|---|---|
| Message | AUTOSYNC |
| Meter type | Alt customl Eng unit |
| Minimum Span | 0.00606 |
| Model | 3051 |
| Model Number 1 | 3051S2CD2A2E12A... |
| Model Number 2 | |
| Model Number 3 | Std coplanar (C) |
| Model Configuratio... | 25.4 |
| Model Temperature | degC |
| Model Temperature | Bad Value |
| Not applicable | 5 |
| Num req preams | PTFE |
| O-Ring Material | 0.005 |
| Percent of Range | Bell 202 current |
| Physicl signl code | 0 |
| Polling Address | Installd |
| Press Alert | 0.000 |
| Pressure | 0.60 |
| Pressure Damping | 0.000 |
| Pressure Input 1 | 9.016 |
| Pressure Input 2 | On |
| Pressure Process AL... | psi |
| Pressure Units | Scaled Variable* |
| Primary Variable | Coplanar |
| Process Connection | 316 SSt |
| Process Connection... | None |
| RS Fill Fluid | None |
| RS isolator Material | None |
| RS Seal Type | Installd |
| scaled available | 0.000000 |
| Scaled Output 1 | 1.000000 |
| Scaled Output 2 | -0.00081 |
| Scaled Output 1 | Sensor Temperature |
| Scaled Variable | 4 |
| Select dec pt pos | 2 |
| Sensor Serial Numb... | 6613968 |
| Software Revision | 8 |
| star | * |

Fig. 3A

| | |
|---|---|
| Lower Calibration Po... | 3.90 |
| Lower Range Value (... | 3.90 |
| Lower Range Value (... | 0.000 |
| Lower Sensor Limit | Bad Value |
| Lower Sensor Limit | -1.00000 |
| MAnufacturer | Rosemount |
| Measurement | Diff (DP) |

314

| | |
|---|---|
| Status group 1 | 0x00 |
| Status group 2 | 0x00 |
| Status group 3 | 0x00 |
| Status group 4 | 0x00 |
| Status group 5 | 0x00 |
| SV Cutoff Mode | Off |
| SV index used | 1 |
| SV Linear Offset | 0.000 |
| Parameter | Value |
| SV Low Flow Cutoff | 0.00000 |
| SV max index | 1 |
| SV Transfer Functio... | Linear |
| SV Units | DEFLT |
| SV Units | *DEFLT |
| Tag | PT-101 |
| Temp Alert | Installd |
| Temp available | Installd |
| Third Variable | Selected Variable* |
| Transfer Function | Linear |
| Transmitter S/N | 2908492 |
| Units of Measure | *DEFLT |
| Universal Revision | 5 |
| Upper Calibration Po... | 9.016 |
| Upper Range Value (... | Bad Value |
| Upper Range Value (... | 0.99995 |
| Upper Sensor Limit | Bad VAlue |
| Upper Sensor Limit | 1.00000 |
| Variable(s) | 0v05 |
| Write Protect Status | Off |

Fig. 3B

CLOUD-HOSTED INTERFACE FOR PORTABLE DEVICE COMMUNICATORS

FIELD OF TECHNOLOGY

The present disclosure relates generally to process control systems, and, more particularly, to a process control system using handheld communicators to access or configure process control devices in a plant.

BACKGROUND

Handheld communicators are mobile computing devices that are used in or near plant and plant equipment sometimes in hazardous environments where the communicators may be used to configure process control devices, such as controllers and field devices, and to collect data from the process control devices. While communication technology may make possible some remote management and collection of remote device data, handheld communicators may still need to be used to directly connect to a process control device to adjust parameters and collect data. This may be for a number of reasons. Sometimes process control devices, such as field devices, are stranded devices that are remote and non-networked (e.g., for legacy systems with network incompatibilities or for isolated processes by design). In some situations, a device may be networked but communication to the networked device is too slow for certain diagnostic applications or modifications. In some systems, the process control devices may not yet be commissioned (e.g., active or online) or may not yet be completely installed (e.g., awaiting configuration and programming from a handheld communicator). In some circumstances, the process control devices may be malfunctioning and require direct onsite connection for diagnosis, calibration, or adjustment. In some circumstances, location specific factors may need to be considered when making modifications, thereby requiring onsite adjustments to a process control device, even for networked devices. Generally, handheld communicators may be used by technicians to make remote, onsite manual configuration adjustments to process control devices, such as field devices or controllers.

When handheld communicators are being used to read from or make adjustments to a process control device, process control device information that is gathered by the handheld communicator may be stored in an onboard memory. This information may include configuration changes, parameter modifications, calibration data, and other information. The handheld communicators may be designed to periodically or continually upload this configuration data to a central device configuration database when communicatively coupled to the database. If the handheld communicators do not have connectivity to the device configuration database or is not otherwise communicatively coupled to a plant network via, for example, a hard wired connection to a workstation, the communicator may cache recorded configuration changes with date and time stamps for later transfer to the device configuration database once the device is connected.

Generally, these handheld communicators are adapted for one way communication of device information collected in the field (e.g., remote area of a plant or plant network) to a central workstation or server. A secondary system to a distributed process control system (DCS) application, such as an Asset Management System (AMS) may include a device configuration management function that is used to manage a configuration database for storing handheld communicator gathered configuration and calibration information on process control devices within a plant for analysis and maintenance of plant device health. While this information is helpful for centralized operators to perform analysis on device health and schedule maintenance and update work schedules, this information could also be useful to instrumentation technicians in the field when operating to configure devices or adjust parameters of a device.

Currently, instrument technicians may not be able to use their handheld communicators to take advantage of the large collection of information in a centralized configuration database. For example, in particular situations when new processes are being implemented and corresponding equipment is delivered that requires commissioning in a manner similar if not same as an existing set of equipment, configuration information on file may be helpful to the instrument technician. Alternatively, in some plants, replicating or referencing prior configurations may be helpful in plants that have a rotating set of equipment for a particular process or subprocess. In this situation, equipment may be periodically swapped out for another set of equipment for maintenance purposes where replacement equipment may need to be calibrated or configured. Another situation where prior configuration data may be helpful is when equipment is periodically reconditioned or re-purposed for other processes based on schedule or period. While instrument technicians could benefit from referencing at least a stored baseline set of existing configurations for particular types of equipment, locating and downloading appropriate configurations may be challenging since raw configuration data may not be in a form useful to a technician in the field.

SUMMARY

The present disclosure describes a method of and system for sharing process control device configuration data between multiple handheld communicator devices over a plant network or public data store. A handheld communicator may connect to and access a process control device. The handheld communicator may generate a configuration profile that records the device parameters of the process control device sometimes including modifications made by the handheld communicator during a configuration session. In an embodiment, the handheld communicator may assign relational identifiers to the configuration profiles such as equipment identifiers and process identifiers. The configuration profiles may be searched for by device identifiers and equipment identifiers. In an embodiment, the configuration profiles may be differentiated by equipment identifiers and associated equipment profiles along with process identifiers. Upon identifying relevant configuration profiles for an equipment set, the configuration profiles for the equipment set or a portion of the equipment set may be downloaded from the plant network or public data store to one or more handheld communicators for installation.

BRIEF DESCRIPTION OF DRAWINGS

FIG. 3 (comprising FIGS. 3A and 3B) illustrates an exemplary plant parameters listing showing a configuration of a plant device.

DETAILED DESCRIPTION

Figure 1:
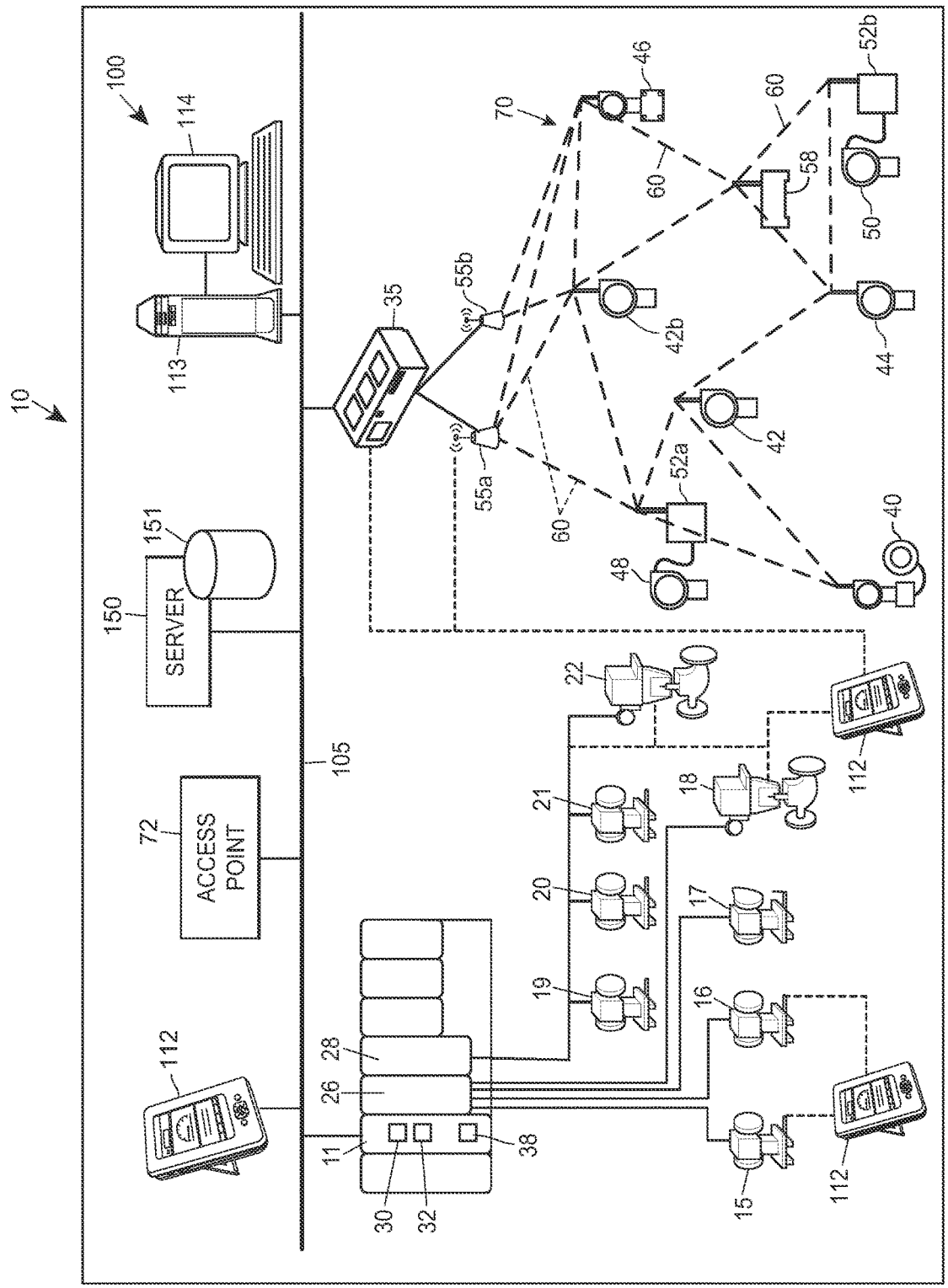
FIG. 1 is a diagram of a distributed process control network located within a process plant or other industrial setting including handheld communicators.

FIG. 1 is a block and schematic diagram of an exemplary process control network 100 operating in a process control system, process plant or other industrial setting 10. The process control network 100 may include a network backbone 105 providing connectivity directly or indirectly between a variety of other devices. The network backbone 105 may include both wireless and/or wired communication channels or links. The devices coupled to the network backbone 105 may include, in various embodiments, combinations of access points 72, portable industrial computing devices 112 which may be handheld or other portable computing devices, such as a laptop computer, a tablet, a hand-held smart device, a portable testing device (PTD), etc., stationary industrial computing devices 113, such as a personal computer, workstation, etc. each having a display screen 114 as well as various other input/output devices (not shown), servers 150, etc.

As illustrated in FIG. 1, the controller 11 is connected to the field devices 15-22 via input/output (I/O) cards 26 and 28 which may implement any desired process control communication protocol, such as one or more of the HART, Fieldbus, CAN, Profibus, etc., protocols. The controller 11 is, in FIG. 1, communicatively connected to the field devices 15-22 to perform control of the field devices 15-22 and therefore control of the plant. Generally, the field devices 15-22 may be any types of devices, such as sensors, valves, transmitters, positioners, etc., while the I/O cards 26 and 28 may be any types of I/O devices conforming to any desired communication or controller protocol. For example, the field devices 15-22 and/or I/O cards 26 and 28 may be configured according to the HART protocol or to the Fieldbus protocol. The controller 11 includes a processor 30 that implements or oversees one or more process control routines 38 (or any module, block, or sub-routine thereof) stored in a memory 32. Generally speaking, the controller 11 communicates with the devices 15-22 and the host computers 113 to control a process in any desired manner. Moreover, the controller 11 implements a control strategy or scheme using what are commonly referred to as function blocks (not shown), wherein each function block is an object or other part (e.g., a subroutine) of an overall control routine that operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course, hybrid and other types of function blocks exist and may be utilized. The function blocks may be stored in and executed by the controller 11 or other devices.

As illustrated in FIG. 1, wireless gateways 35, and wireless communication networks 70 are likewise communicatively coupled to the network backbone 105. The communication networks 70 may include wireless devices 40-58, which include wireless field devices 40-46, wireless adapters 52a and 52b, access points 55a and 55b, and a router 58. The wireless adapters 52a and 52b may be connected to non-wireless field devices 48 and 50, respectively. Though FIG. 1 depicts only a single one of some of the devices connected to the network backbone 105, it will be understood that each of the devices could have multiple instances on the network backbone 105 and, in fact, that the process plant 10 may include multiple network backbones 105.

The industrial computing devices 112, 113 may be communicatively connected to the controller 11 and the wireless gateway 35 via the network backbone 105. The controller 11 may be communicatively connected to wireless field devices 40-46 via the network backbone 105 and a wireless gateway 35. The controller 11 may operate to implement a batch process or a continuous process using at least some of the field devices 15-22 and 40-50. The controller 11, which may be, by way of example, a DeltaV™ controller sold by Emerson Process Management, may be communicatively connected to the process control network backbone 105. The controller 11 may be also communicatively connected to the field devices 15-22 and 40-50 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1, the controller 11, the field devices 15-22 and the I/O cards 26, 28 are wired devices, and the field devices 40-46 are wireless field devices.

Moreover, the one or more portable industrial devices 112, which may be field device maintenance tools, multimeters, portable loop power supplies, field device configuration tools, etc., may be intermittently communicatively connected to one or more of the field devices 15-22, 40-50 and/or to one or more of the buses or communication lines to which the field devices 15-22, 40-50 are connected (e.g., a HART loop, a Fieldbus segment, etc.), with such connections being illustrated with dotted lines in FIG. 1. Such network connections may include the hardwired lines connecting one or more of the field devices 15-22, 40-50 to the I/O cards 26 and 28 via the backbone 105, for example. Alternatively, the portable industrial devices 112 may be communicatively connected directly to ones of the field devices 15-22, 40-50 (e.g., via communication terminals present on the field devices 15-22, 40-50). In some cases, the portable industrial devices 112 may provide power to the field device 15-22, 40-50 or to the wire loop to which it is connected. Moreover, the portable industrial devices 112 may enable a user to communicate with, configure, perform maintenance activities on, and/or diagnose one or more of the field devices 15-22, 40-50 when these field devices are installed in the plant. In still other cases, the portable industrial devices 112 may include wireless interfaces that may be used to connect wirelessly to one or more of the field devices 15-22, 40-50, such as a Bluetooth interface, a Wi-Fi interface, or a wireless process control protocol interface or connection, such as those that use the WirelessHART protocol. The portable industrial devices 112 may be described herein or referred to herein as handheld communicators and may directly connect to industrial computing device 113 (described herein also as a workstation) via a hard wire cable such as a USB connection to upload collected device data to the computing device 113 or the server 150 and database 151 via the computing device 113.

The handheld communicators 112 may generally be used for configuring, supporting, and maintaining field devices and may thus be used to, for example, support process measurement devices, such as pressure, temperature, level, flow analytical sensor, flow meters, valve positioners, etc. However, the handheld communicators 112 could be used to support, connect to, maintain, communicate with, or otherwise be used with other types of devices including, for example, vibration detection and analysis equipment, power generating equipment, switches, motors, pumps, compressors, drives, mechanical vessels, such as tanks, pipes, etc., electrical power distribution devices, switch gear, motor control centers any other stand-alone equipment (e.g., equipment not communicatively connected to a process controller, for example), or any other types of industrial equipment. In these cases, the handheld communicators 112 could have various different types of communication and electrical generation and detection hardware (e.g., voltage, current, impedance, etc. generation and detection equipment) to perform maintenance on, configuration of, and/or communication with these other types of industrial equipment.

In some embodiments, the handheld communicators 112 may be brought to the site of one of the field devices 15-22, 40-50 in the process plant. The handheld communicators 112 may be temporarily connected via a wired and/or a wireless connection to the field device 15-22, 40-50 for calibrating, configuring, troubleshooting, monitoring, controlling, or performing any other suitable operations on the field device 15-22, 40-50. Additionally, the handheld communicator 112 may be temporarily connected via a wired and/or wireless connection to the controller 11 for calibrating, configuring, troubleshooting, monitoring, controlling, or performing any other suitable operations on the controller 11.

In operation, the industrial computing devices 112, 113, may each execute a user interface (UI), allowing the industrial computing device 112, 113 to accept input via an input interface and provide output at a display. The industrial computing device 112, 113 may receive data (e.g., process related data such as process parameters, permissions, log data, sensor data, and/or any other data that may be captured and stored) from the server 150. In other embodiments, the UI may be executed, in whole or in part, at the server 150, where the server 150 may transmit display data to the industrial computing device 112, 113. The industrial computing device 112, 113 may receive user interface data (which may include display data and permission data) via the backbone 105 from other nodes or endpoints in the process control network 100, such as the controller 11, the wireless gateway 35, other industrial computing devices, or the server 150. The server 150 may be communicatively coupled to a database or data store 151 which can hold data for one or more process control applications running at least at the server 150 or at a device 113. As used herein plant devices such as controllers, field devices, and I/O devices used to manage and control one or more process variables are herein referred to as process control devices or plant devices.

Figure 2:
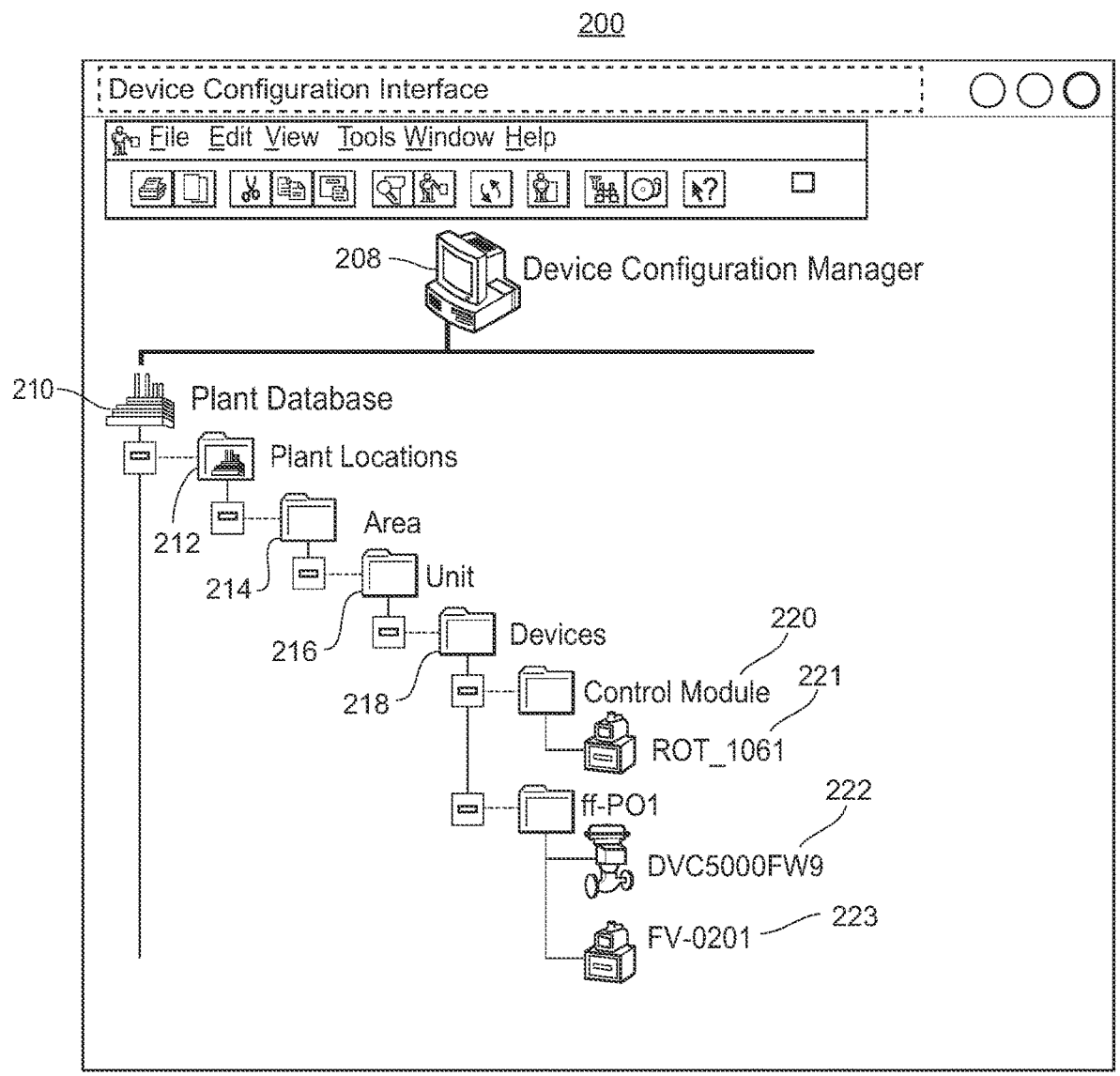
FIG. 2 illustrates a system using a device configuration manager application interface that organizes information from a plurality of device communicators.

FIG. 2 illustrates a graphical user interface for a plant device configuration application 200 to manage process control device configurations in the process plant. In some systems, a device configuration application may be communicatively coupled to a device configuration database for storing and recording configuration and calibration information on plant devices. In some systems, the handheld communicators 112 described above may be an integral part of the data collection scheme of the device configuration application. A typical user of a handheld communicator 112 may be an instrumentation technician. The collected configuration data from the handheld communicators 112 may be organized in a manner as illustrated in FIG. 2.

FIG. 2 illustrates a plant workstation 208, such as device 113, connected to a plant configuration database 210. The plant database 210 shows an organization of configuration files based on categories including plant location 212, area within a plant 214, plant unit 216, and devices/equipment 218. The categories may be selected or opened to view details or content of the category. For example, a device icon under the equipment/devices category 218 may represent a configuration file for the device 220, 221, 222, 223. Device 220 may be a controller or a control module of the controller. Device 221 may be pressure transmitter. Device 222 may be a valve actuator. Device 223 may be a valve position transmitter. Selecting a device icon 220-223 may display the contents of a configuration file for a device. FIG. 3 illustrates an example configuration file 300 for a process control device such as a pressure transmitter. It should be noted that the organization illustrated in FIG. 2 is exemplary only and in some embodiments, only some categories may be used to organize configuration data.

Existing handheld communicators may be primarily designed to safely connect to a process control device, configure that device and route configuration data in one direction: towards a central device configuration database 210 (e.g., via a device configuration manager application 200). Handheld communicators may be designed to be intrinsically safe where restrictions are placed to minimize power consumption in such devices. The effect of these restrictions may be to limit processing capacity and memory storage of the handheld communicators which in turn may limit a number, size, and type of applications that can be running on a handheld communicator. Processing capacity of a handheld communicator may prioritize applications that serve the primary function of the communicators: on-site manual configuration of plant devices, caching or recordation of device configurations, and transfer of those device configurations to a central repository to free up local device memory for additional configurations. Generally, the configuration data may be used for centralized record keeping and report generation. For example, a device configuration manager 200 as discussed herein may be part of a larger suite of applications that uses device configuration data, among other types of data and sources, to generate useful aggregated device maintenance reports, device health reports, etc.

While retrieving and referencing a prior device configuration file may be useful in replicating parameter changes for a different but similar device, configuration data may be retained in a manner where locating appropriate configuration files for use at a handheld communicator may be cumbersome and time consuming. FIG. 3 (made up of FIGS. 3A and 3B) illustrates a general configuration file that be stored in memory or a configuration database. FIG. 3 illustrates data generally collected from a configuration of a process control device such as a Rosemount 3051 pressure sensor/transmitter. The configuration may be specific to the process control device and identified by device ID 310, device model/type 312, and function 314. FIG. 3 illustrates that the configuration file or profile may contain a full listing of all parameters of a pressure transmitter. Querying a data store, database, or table by device type 312 or even device tag 310 may produce many dozens or hundreds of files. Finding or distinguishing one or a few of the configuration files that are appropriate for a particular process control device application may be more cumbersome than performing a manual configuration or testing process anew. Loading a large number of these configuration files, as a result of these types of searches may be unfeasible with the limited processing capacity of the handheld communicators.

As discussed above, the limited capacity and transient nature of configuration files in handheld communicators may severely limit the type and number of configuration profiles retained in a particular handheld communicator. However, where a technician may recognize the appropriateness of replicating a configuration on one or more devices, and that configuration data is available on the technician's handheld communicator, the technician's workload and efficiency may be greatly reduced in replicating and installing the referenced configuration data to those machines. However, having the appropriate configuration file remaining in a handheld communicator may be a product of happenstance.

There are times when a technician may desire to replicate the configuration process for a current device from a configuration the technician has performed in the past on a similar device with a similar set of circumstances. Alternatively, there may be times when a technician may desire to replicate a configuration based on a configuration performed by different technician where a particular difficult or complex configuration is to be made on a similar setup. When a technician would like to replicate a configuration, the technician may favor using configurations the technician installed in prior sessions because the technician has prior knowledge of the installation and the circumstance(s) for that configuration. For example, a technician may have recent knowledge of the circumstances for servicing or configuring a control valve. However, once device configuration data is uploaded to an AMS device manager, that data may be deleted from the handheld communicator due to memory constraints. Moreover, the handheld communicators may be assigned to different technicians with no guarantee that a technician will be able to use the same handheld communicator in a prior session.

A field technician generally tasked to perform remote site configurations using handheld communicators may greatly benefit from referencing configuration data the user has prior experience with or that matches a set of circumstances surrounding a current device the technician is servicing. For example, similar circumstances may include a similar or identical set of equipment communicatively coupled to a process control device that the technician recognizes. Useful configuration data may include the configuration files that the technician was personally involved in creating since the user has firsthand knowledge of the circumstances surround the configuration, e.g., field factors, devices connections, etc. Moreover, a field technician may also greatly benefit from configuration files generated by other field technicians where the configuration files may be similar or match a set of current equipment and/or process.

Figure 4:
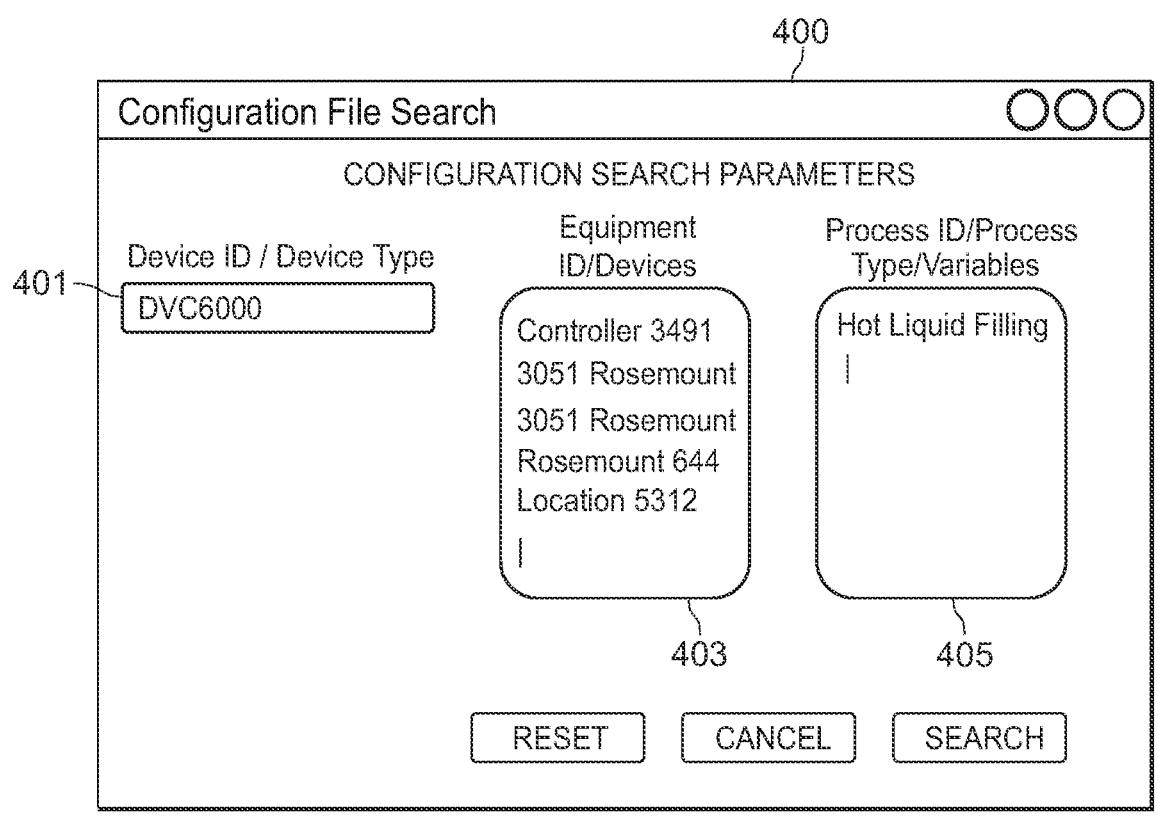
FIG. 4 illustrates an exemplary search interface for querying and retrieving device configuration files according to an embodiment.
Figure 5:
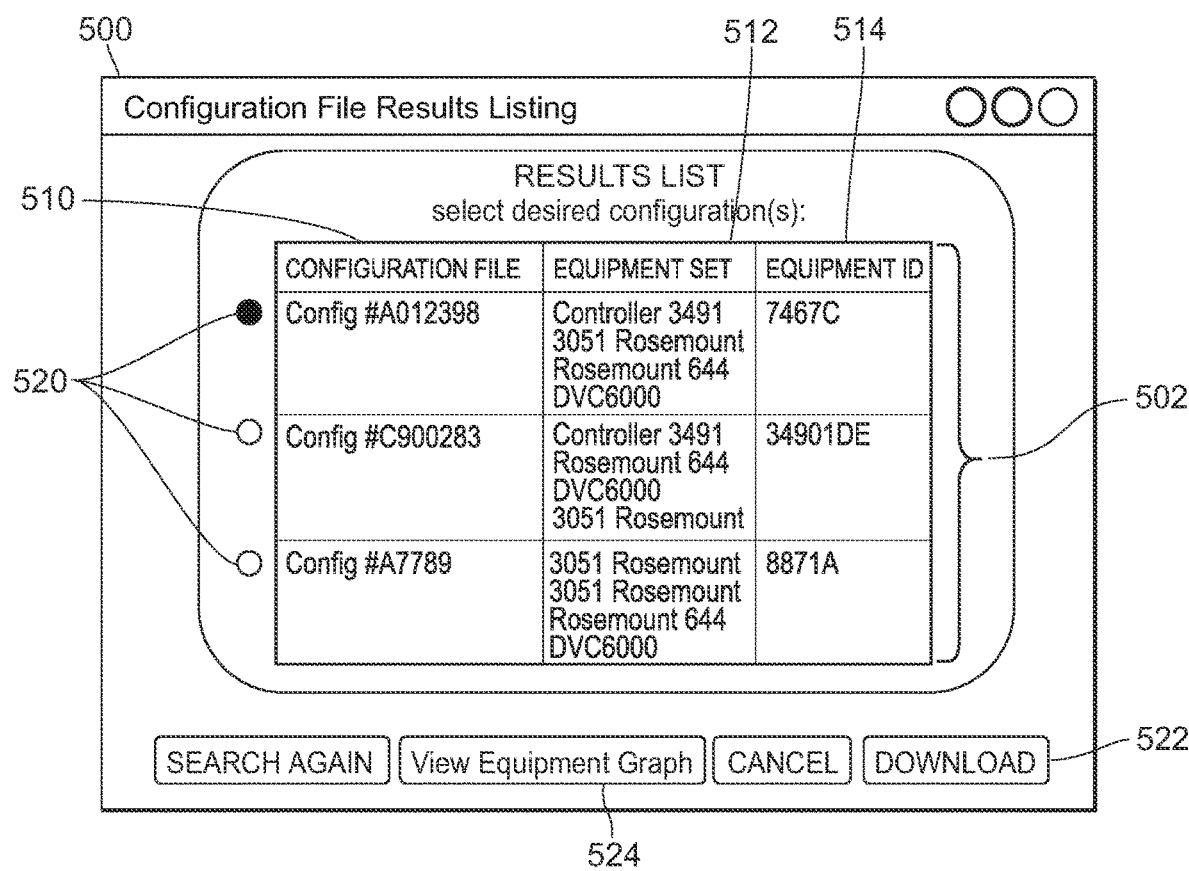
FIG. 5 illustrates a search result screen for matching configuration files according to an embodiment.
Figure 6:
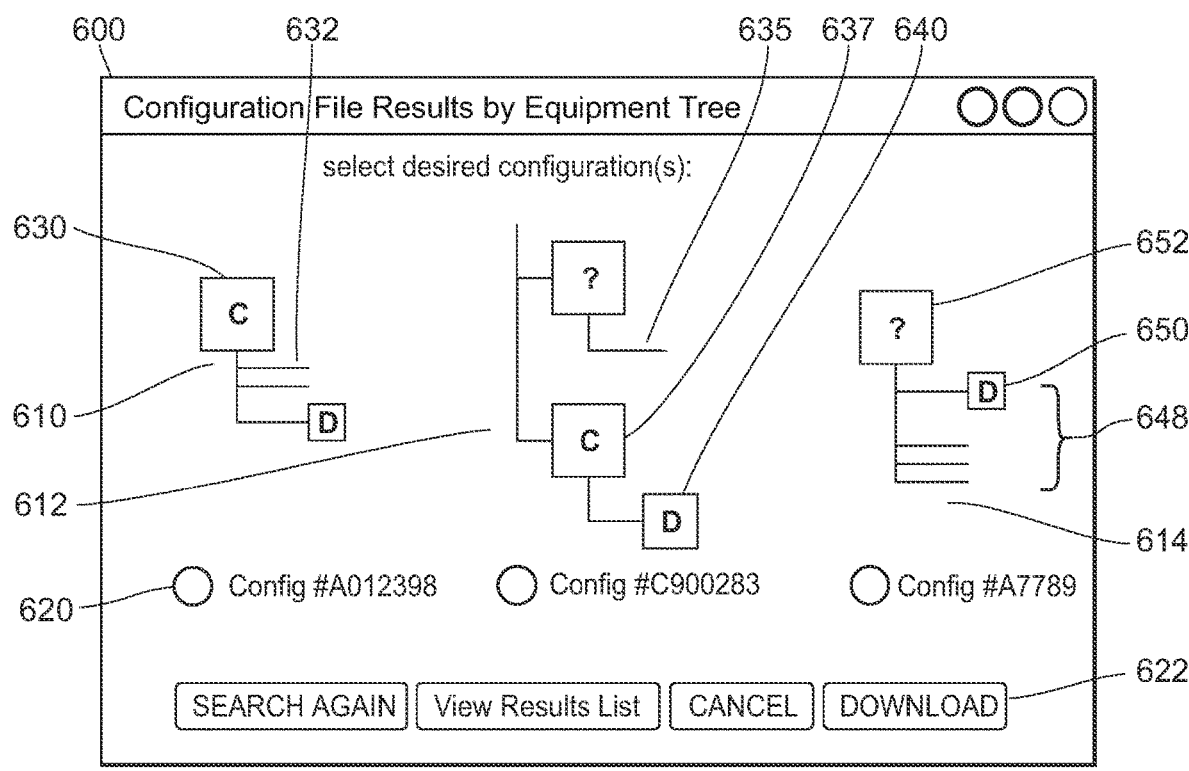
FIG. 6 illustrates a search result screen for matching configuration files in graphical form according to an embodiment.

FIGS. 4-6 illustrates a set of user interfaces for managing process control device configuration files that are generated by one or more handheld communicators and centrally stored for retrieval upon demand by handheld communicators. FIG. 4 illustrates an exemplary search screen 400 for querying or searching for configuration profiles. An input box 401 allows a user to enter a process control device identifier (ID) or a device type. In an embodiment, the device identifier may indicate a device type. Input box 403 allows a user to input a set of relational equipment identifiers or an equipment profile associated with the device in input box 401. Input box 405 allows a user to input a process control identifier, a process description or type, or a set of process variables for identifying a process affected by the device identifier or device type in box 401.

FIG. 5 illustrates a configuration search result window 500 including an exemplary listing of configuration files or profiles 502 by configuration identifier that matches or partially matches the query of FIG. 4. FIG. 5 illustrates a column for configuration identifiers 510, equipment set 512, and equipment identifier (ID) 514. In an embodiment, the search results may also indicate a process identifier (not shown). The user may select one or more configuration profiles to download to, for example, a handheld communicator, by clicking the selection circles 520 next to each configuration profile set and then selecting download 522. FIG. 5 also illustrates that a user may select to view an equipment graph 524 for the configurations showing the connections or associations between the equipment set.

FIG. 6 illustrates a search result set 600 window displayed as equipment graphs. The result set of FIG. 5 are shown as equipment graphs 610, 612, and 614. Similar to the table listing illustrated in FIG. 5, a user may select one or more sets of configuration profiles (based on equipment set) to download by clicking the selection circles 620 and then selecting download 622. FIG. 6 illustrates that the graphs show nodes 630 and terminal lines 632, where the nodes 630 may indicate a controller or an I/O device where the terminal lines 632 may indicate field devices. FIG. 6 is only an exemplary embodiment of a display graph that can be used. In other embodiments more or less details may be added to the display results and may use different icons and graphing conventions. Graphs 612 and 614 illustrate one particular feature of an embodiment for the equipment profile results. In particular, an equipment set here may include a plant device 635 such as a field device that is not under the direct control of a controller 637 for a current target device 640 marked with letter "D". The field device 635 may be included in the equipment set as it is referenced by a technician that generated the equipment. This may be the case where the device 635 may be a field device involved in the same process or related process as the target device 640. Another feature is that not all device connections may be a part of the equipment profile. For example, in equipment profile graph 614, the field devices 648 including a target device 650 may be part of an equipment profile even though a controller 652 (e.g., displayed with a question mark "?") is not included.

Figure 7:
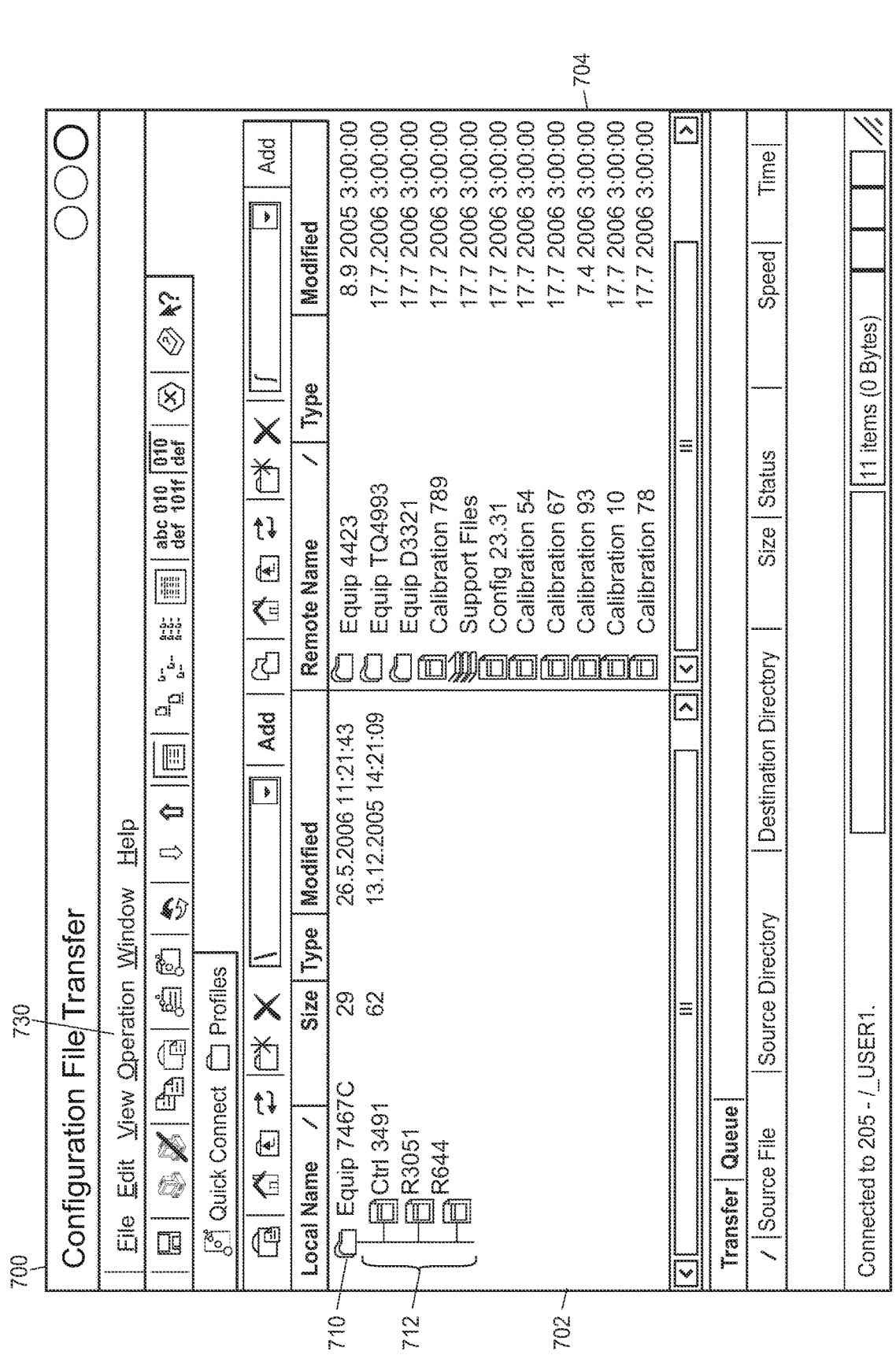
FIG. 7 illustrates an exemplary configuration file transfer interface according to an embodiment.

FIG. 7 illustrates an exemplary file transfer or download selection screen 700. The example file transfer screen of FIG. 7 may be reached when a user selects, for example, the first configuration file of FIG. 5 or 6 and then selects download 522 or 622. FIG. 7 illustrates a left transfer box 702 for a source of the configuration files, such as an AMS device manager application or configuration database, and a right transfer box 704 as a destination for transfer of the configuration files. FIG. 7 shows that the left transfer box 702 is populated by the equipment set 710 marked as "7467C" selected in FIG. 6 or 7 including component configuration files 712 of each device under the equipment set. In an embodiment, a user may select all or a subset of the configuration files 712 to download to a handheld communicator memory illustrated in the right transfer box. In an embodiment, the user may click on one or more of the icons associated with the device configuration files 712 to mark those configuration files for transfer. In an embodiment, the user may select the menu "Operation" 730 and select an option under that menu to transfer the files to the destination device. After successfully transferring the files, the right transfer box 704 may be populated with the corresponding transferred files. In alternative embodiments, an action button for the transfer may be included on the GUI to initiate the transfer.

Figure 8:
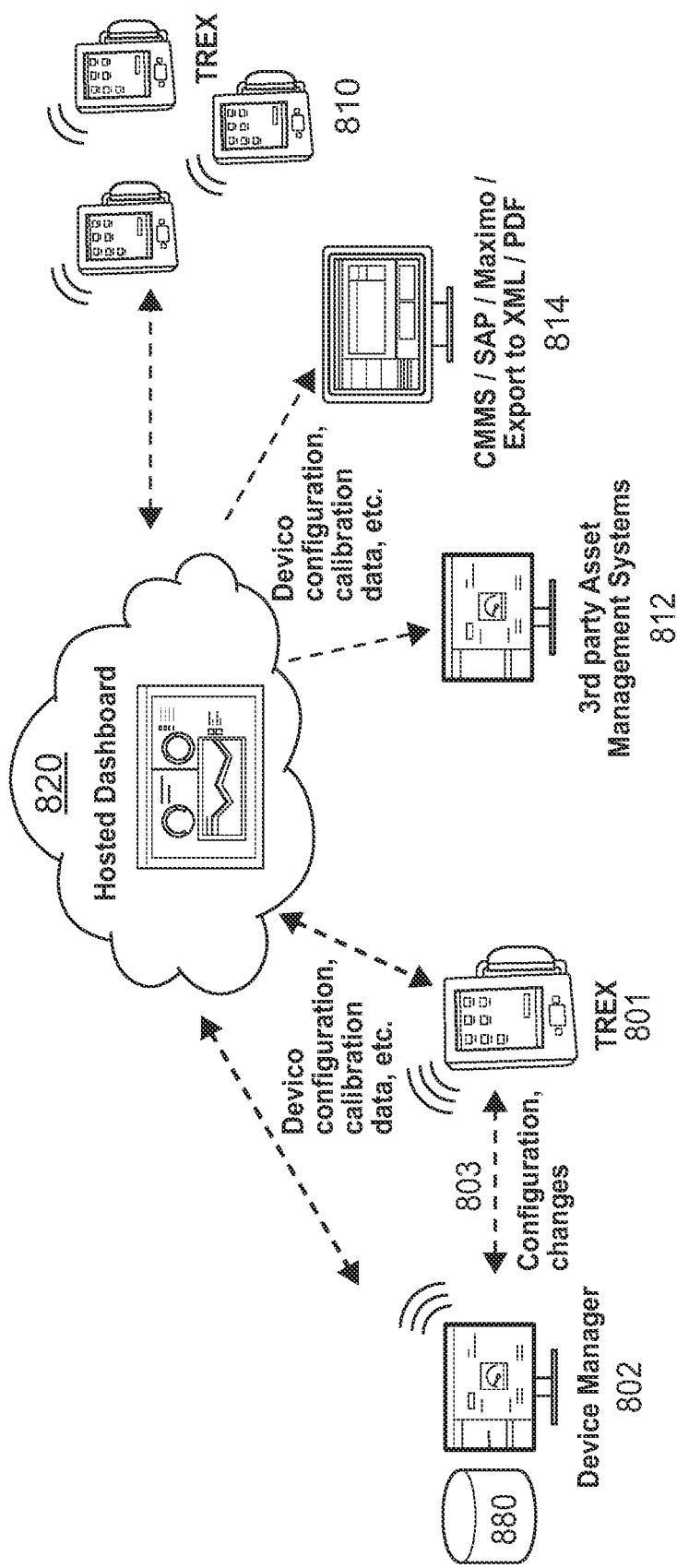
FIG. 8 illustrates a system of managing configuration data and providing configuration data to an instrument technician in the field using a handheld communicator.

FIG. 8 illustrates a handheld communicator 801 communicatively coupled to a workstation or server hosting a device manager application 802. As discussed the communication coupling between a handheld communicator 801 and a device manager 802 has traditionally been one way: towards the device manager for uploading device configuration and calibration data. FIG. 8 illustrates that the data flow may be two ways 803 using the method and system described herein. In this system, the handheld communicator 801 may be adapted to download data from the device configuration manager 802 using the search and retrieval process described. FIG. 8 also illustrates that handheld communicators 810 as well as the device configuration manager 802 for a particular plant may be communicatively coupled to a cloud server 820 or public data store. The cloud server may allow third party applications such as asset management applications 812 or CMMS applications 814 to access the configuration files.

The handheld communicators 801 and 810 of FIG. 8 may be adapted to assign relational information to the configuration files that describe secondary devices to or processes affected by a process control device or process control device configuration. The relational information may vary based on user input, but at least some relational data (e.g., a small set of associated equipment) may be used to determine whether a configuration file is appropriate for replicating to another similar type of device(s) and/or is recognized by a technician or handheld communicator device that generated the configuration file.

The device configuration manager 802 may receive the configuration files with relational information and store the configuration files indexed by equipment identifier and/or process identifier.

Using the search interfaces of FIGS. 4-7 and the system of FIG. 8, a user may now be able to query for configuration files for a plant device based on equipment sets or equipment profiles and retrieve those configuration files over a plant network or via cloud access when connected. A technician may search for configuration files based on device connections that may be relevant to a particular process control device's configuration. The technician may be able to search for a configuration of a device not only by its identifier or type but also by what the device is connected to. As plant devices are frequently connected to other devices, the identity and types of connected devices may usually play a role in the configuration of the device. The connections of the other equipment to the device may be helpful in identifying a particular configuration file or profile (used interchangeably herein) generated by a handheld communicator or a by a user of the handheld communicator. In circumstances where a plant device is a standalone device, an equipment set of one element may also provide valuable information on the configuration of the device. In particular, standalone devices may have particular applications and these types of devices may further be distinguished based on the process the device is used to manage. A process identifier in this situation may be helpful in searching for the configuration for the device.

In an embodiment, the equipment identifier may indicate a set of process control devices associated with a device. For example, if a device is a field device sensor, an associated device could be an I/O interface, a process controller, or other field device sensor monitoring the same or similar process. In an embodiment, the equipment identifier may identify a group of equipment that includes a current device and the configuration of that device within the group. When querying for the configuration files based on equipment identifier, the identifier may return different portions of an equipment set surrounding a particular device (see for example graph 652) including, in some embodiments, the configuration profiles for each equipment in the group. The results of the query can be further reduced by the type of equipment identifier or equipment set indexed to the equipment identifier. For example, in some equipment sets, the equipment identifier may only include the current field device and the controller communicatively coupled thereto. In an embodiment, it may include additional sensors or I/O devices. In an embodiment, the equipment identifier may be user specified or generated based on a configuration session with a technician where the equipment identifier is assigned based on a limited set of observations by the user or the handheld communicator.

The device configuration manager 802 may record indexed configuration profiles by equipment identifiers. In an embodiment, the device configuration manager may also index configuration profiles by process or by a process identifier. Generally, a plant process or subprocess may be defined by a set of process variables. For example, in a filling process, the process variables may describe a plant process action as a filling process defined by a flow rate, temperature, pressure, etc. Process control devices may generally be used to manage these plant processes, where configuration of the process control devices is generally related to one or more of such plant processes. Process variables may be observable relational data that may also be used to assist a technician in finding an appropriate configuration file. In an embodiment, the process control identifier may index a process control module that controls a particular set of equipment to manage a process variable.

In some embodiments, additional identifiers for describing the configuration profile may be assigned. In an embodiment, a location identifier may be assigned indicating a position of a process control device. The location may be local, for example within a process plant, or more global such as a city or town (e.g., by using GPS coordinates). In an embodiment, a location identifier may be metadata specific to a particular process plant. If the location data has relevance to a configuration it may be used as an additional relational identifier assigned to the configuration profiles similar to an equipment identifier or a process identifier.

A device configuration database (CDB) 880 may be communicatively coupled to a workstation running a device configuration manager 802 and may provide configuration files related to DCS and AMS applications using the data based on device identifier and device type. In an embodiment, the CDB 880 may also store configuration files with equipment identifiers and the associated partial equipment profiles. While the device configuration manager 802 may have access to a broader set of data the includes more complete equipment maps of some or all device connections within a plant, the partial equipment profiles associated and/or received with a device configuration as described may still be stored as partial equipment profiles in database 880. The relational information in the equipment identifiers and process identifiers may provide relevant device configuration information that otherwise may not be captured by existing device configuration processes. In particular, the equipment identifiers may capture handheld communicator specific and technician specific associations for the configuration files. For example, in a case of diagnosis and repair of a field device, the equipment profile generated for that configuration may provide a technician more identifiable and distinguishable information on the repair configuration when related to an associated device. The partial equipment profiles may relate to a particular configuration process that provides additional meaning and information not provided by simply referring to a system map of device connections. For example, a first user may generate an equipment profile when configuring a field device sensor 1 by observing and recording a field device sensor 2 associated with sensor 1 in the field for a particular process. The association of sensor 2 to sensor 1 is valuable identifying information for the configuration profile and is recorded by the CDB in an embodiment. It should be noted that the configuration of the first sensor may be affected by the existence of the second sensor. Thus, user input associating the first and second process control devices (sensor 1 and sensor 2) may have relevance to the configuration profile.

FIG. 8 illustrates a cloud storage application or server 820. This cloud server 820 could provide a distributed data store of device configurations that may now be searched by device type(s), equipment profile/equipment identifier, and/or process profile/process identifier. This cloud sharing may be a privately supported database, for example an equipment manufacturer database, that provides open source configurations files identified by equipment identifier and process identifier. Because the configurations may be identified by associated equipment or associated subprocess, the data may be anonymized to a certain degree. In some embodiments, plant specific identification attributes may be stripped or removed from the configuration data before it is pushed to a public data store such as a cloud server 820. In this manner, plants and plant management may be more open to sharing their configuration files or having them uploaded to a shared platform external to their own plants.

In an embodiment, upon downloading a desired set of configuration profiles by a handheld communicator using the system and method described herein, the handheld communicator may be adapted to automatically install those configurations without a user needing to proceed through a device menu screen to make parameter changes to a process control device. By downloading an equipment set of configuration profiles, the user or technician may be able to replicate the configuration an entire group of related or associated equipment thereby saving time and effort.

Figure 9:
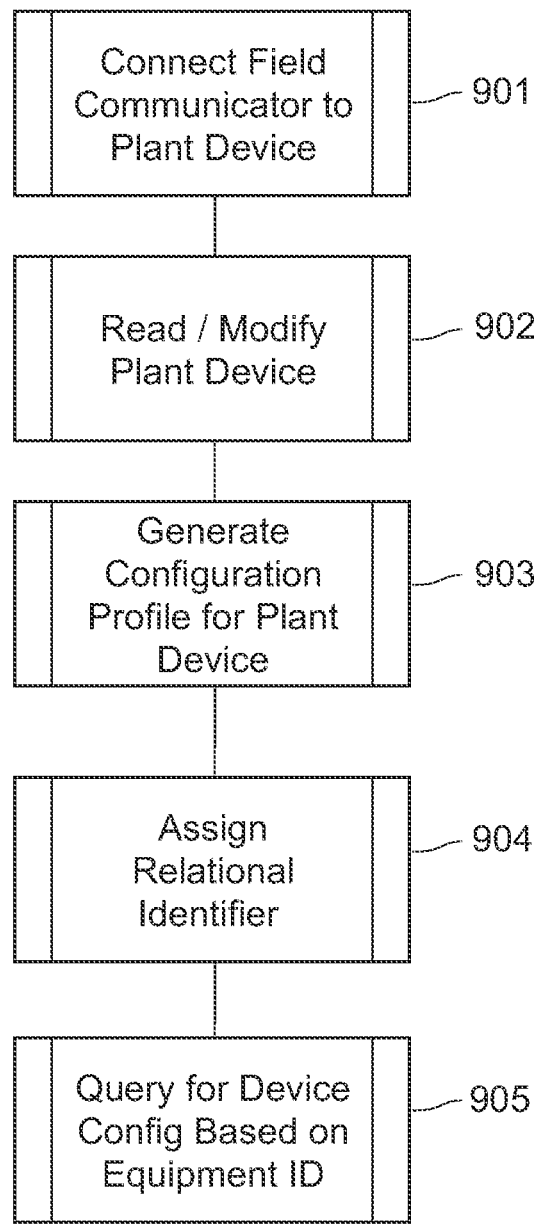
FIG. 9 illustrates a method of modifying a handheld communicator to provide organized configuration data based on equipment configuration templates.

FIG. 9 illustrates an exemplary method for managing configuration data of a handheld communicator to enable quick retrieval of relevant plant device configuration data sets for replication. At block 901, a first communicator device may be connected to a first process control device for accessing or servicing the first process control device. The first communicator device may be connected directly to the process control device such as a field device using, for example, a cable. In other embodiments, the first communicator may be connected using a non-wired connection or wireless connection. As discussed, restrictions may be in place for handheld communicators where only certain kinds of wireless connections may be permissible for connection to a process control device. Once the first handheld communicator is communicatively coupled to the first process control device, the handheld communicator may access a device parameter menu of the first process control device.

At block 902, the first handheld communicator may read parameter values and modify parameter values of the first process control device once connected to the process control device. The configuration reading and adjustments may be performed by a technician using a device parameter menu displayed and accessed by the first handheld communicator. A current state of the field device may be read by the handheld communicator and displayed to a technician using a user interface of the first handheld communicator. The technician may then configure or adjust parameters of the first process control device. In an embodiment, a configuration file may be installed using an installation program of the communicator without using a device menu tree of the process control device for each device parameter change.

At block 903, a configuration profile may be generated for the first process control device. In an embodiment, the configuration profile may include a device identifier, a device type, a set of process control device parameters, and a date/time stamp. The set of process control device parameters may include the device parameters modified by the first handheld communicator. In an embodiment, the handheld communicator may generate a configuration profile for the first process control device when performing a read of the device without parameter changes.

At block 904, a relational identifier such as an equipment identifier may be assigned to the configuration profile generated at block 903. An equipment identifier may index an equipment profile that includes the first process control device. The equipment profile may include a set of process control devices that are associated with each other. The equipment profile may include device identifiers of associated process control devices. In an embodiment, the set of process control devices of an equipment profile may be communicatively coupled to each other. For example, the set of process control devices may represent a segment of a process plant used to perform a process or a subprocess. For example, in a process plant having a filling process or subprocess, a segment may be a control loop for the filling process that includes equipment or set of process control devices including a field device flow sensor, a valve actuator, a process controller, and one or more I/O devices. In an embodiment, the handheld communicator may execute a segment analysis or a detection routine on a process control device to determine other devices that the process control device is communicatively coupled with. The handheld communicator may then generate an equipment profile with corresponding equipment identifier for this set of devices.

In an embodiment, the set of process control devices may include some devices that are not communicatively coupled to the first process control device but have a relationship to the first process control device. For example, some devices may be proximal to the first process control device or may affect a related process as the first process control device but may not be in direct communication with the first process control device. In some circumstances a technician may service unrelated process control devices. For example, some devices a technician services may belong to a different equipment profile.

In an embodiment, assigning an equipment identifier at block 904 may include assigning a different equipment identifier to each configuration for each separate process control device configured by a handheld communicator. In an alternative embodiment, assigning an equipment identifier at block 904 may include determining whether a device identifier of the first process control device is already associated with an equipment profile referenced by the first handheld communicator. For example, in a situation in which a technician has serviced multiple field devices in a remote area of a plant, a subset of the field devices may belong to the same equipment profile. In an embodiment, the handheld communicator may be programmed to prompt a user whether a new process control device currently being accessed or configured belongs to one of an existing set of equipment profiles. For example, the handheld communicator may prompt the user upon saving a configuration profile whether the device or configuration profile is associated with a listing of existing equipment (stored in memory) and allows the user to select an equipment profile from a displayed list to associate with a current configuration.

In an embodiment, the equipment profile may be generated by the handheld communicator. In circumstances where the handheld communicator is initiating a new workflow and has no prior configurations referenced, a new equipment profile may be generated with an equipment set of one device (e.g., an equipment set containing the currently configured first processed control device). The equipment identifier may be generated as a unique identifier. As additional devices are configured by the handheld communicator, the equipment profile may be modified to include the additional devices. In an embodiment, the handheld communicator may periodically prompt a user to confirm whether a current configuration profile is associated with one or more equipment profiles referenced by the handheld communicator. In an embodiment, the handheld communicator may reference a set of equipment profiles stored in an internal memory where the reference equipment profiles may have been downloaded during a connection period with a device configuration manager or device configuration database. In this embodiment, the referenced equipment profiles may include location information and be indexed by location identifiers which can be assigned to a configuration profile. In an embodiment, the reference equipment profiles may provide reference information for a user to confirm a certain set of connections or identify proximal devices without installing the configurations of the equipment profile. In this embodiment, the user and the handheld communicator may still create a separate equipment profile from the referenced and downloaded profiles for a current device configuration.

In an embodiment, the handheld communicator may receive an input from a user to assign an equipment identifier, or an equipment profile, to a field device or other process control device. For example, the user may input device identifiers for equipment proximal to the first process control device being serviced thereby creating an equipment profile. The handheld communicator may be programmed to assign a unique equipment identifier to the user generated equipment profile. In another example, the user may input equipment identifiers for other plant devices affecting the same process as the first process control device. In an embodiment, a process control identifier may be used to further distinguish equipment profiles or match equipment profiles.

Figure 10:
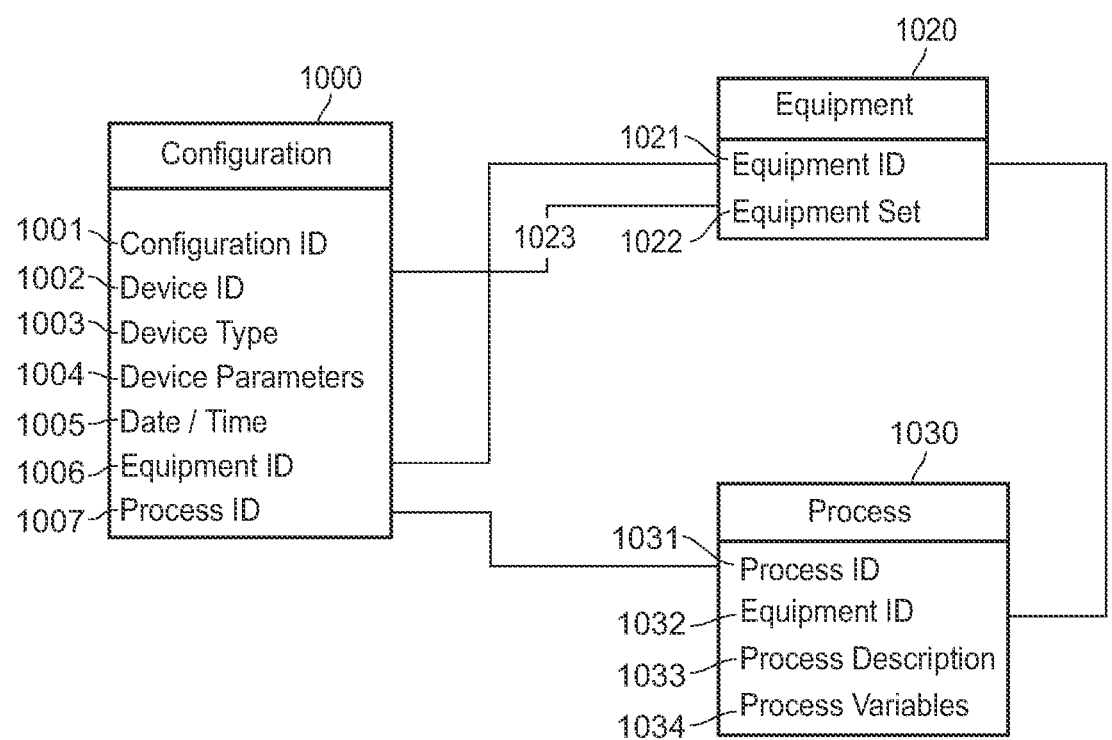
FIG. 10 illustrates an example data model that may be used with the method illustrated in FIG. 9.

FIG. 10 illustrates a data model that may be used to enable process control device configuration data to be easily managed, stored, and retrieved by technicians for replicating installations according to an embodiment. The data model may be implemented as a database or tables in a database, such as DCB 880. FIG. 10 illustrates that a configuration profile 1000 may include the following parameters: configuration identifier 1001, device identifier 1002, device type 1003, device parameters 1004, and date/time 1005. The configuration profile may be assigned an equipment identifier 1006. The date/time stamp 1005 may be a date and time the configuration profile was generated or updated. In some embodiments, the configuration profile may also include a process identifier 1007 that identifies a process profile.

The equipment profile 1020 may include an equipment identifier 1021 and an equipment set 1022. The equipment set 1022 may be a listing of device identifiers. As shown by line 1023, the equipment set 1022 or equipment profile for a configuration of a device may include the device identifier 1002 of the device. In some embodiments, the device identifiers 1022 may also index device profiles that provide additional descriptive information of the device such as device location. Alternatively, device location may be an attribute or parameter of the configuration file for a device.

The process profile 1030 may include a process identifier 1031, an equipment identifier 1032, a process description 1033 and process variables or process parameters 1034. The process description may be an organization designated name for the process or subprocess of the plant such as Hot Fill F001. The process description may also describe the process type, such as "Filling." The process variables may be parameters that define the process such as pressure, level, temperature, flow, etc.

The data model of FIG. 10 may describe relationships between devices, equipment, and processes. Generally a plant process may require a set of devices or equipment to operate a plant process. The same equipment however may be used by other processes. This may be the case in plants that have different batch processes scheduled using the same equipment set. Further, equipment may be regularly rotated for maintenance or other reasons for the same process. FIG. 10 illustrates that equipment, equipment sets, or equipment profiles (described interchangeably herein) may have different configurations or configuration profiles depending on a process. A process may have different equipment with different configurations. Devices may belong to more than one process and more than one equipment set. By assigning the appropriate equipment identifier and process identifier to a configuration profile of a device, a technician may be able to use these identifiers to easily reference, retrieve, and share relevant device configuration profiles easily when configuration data is accessible across communication platforms. Moreover, a technician may be able to access configuration profiles that the technicians themselves created by referencing a group of devices that were associated with a device type or a process affected by the device type (or particular device, for example, with unique device identifier). These references may make device configurations easier to distinguish from each other and incorporate additional relevant connection information to the configuration data, thereby making searching for the appropriate configuration data for device replication easier and more convenient.

Referring back to FIG. 9, at block 905, a plant device configuration (e.g., configuration profile) may be queried for or searched for based on equipment related to the plant device. Using the described method and system of storing and marking data, queries may be made based on a technician's observation of the environment surrounding a process control device. For example, a technician may want to replicate a configuration profile for one or more devices. The technician may search for or reference configuration profiles by their relational descriptors, such as by an equipment set or by a process. For example, the user may be in the field and encounter a similar set of devices as a previous installation or device calibration. Instead of performing a configuration process from the beginning, the technician may want to use a previous configuration file or profile. The user may want to retrieve one or more prior configuration files (e.g., configuration profiles) from a central configuration database for automatic installation by the handheld communicator on one or more process control devices. As discussed, querying for a configuration file by device identifier alone may generate a large number of results as a plant may have several of the same type of device. Using the described techniques, the technician may, for example, generate a query using device identifiers of nearby devices to reduce the result set. Where multiple configuration profiles exist for the same equipment, a process identifier may be used to further distinguish the appropriate configuration profiles to retrieve a configuration(s) for a user's particular situation. For example, besides observing associated devices to a target device, the technician may also recognize a particular process being managed by the process control device currently under configuration.

In addition to querying a central device configuration manager or database for configuration profiles, handheld communicators may query for and retrieve configuration data from another handheld communicator at block 905. For example, in situations where a direct connection or wireless connection exists between two communicators, a technician at a first communicator can easily determine if a second communicator has an appropriate configuration file for applying to a particular process control device in the field. A partial equipment profile with only a small number of associated equipment contained therein or a process identifier may be useful in determining whether configuration profiles stored in the second handheld communicator can be used by the technician on a current process control device in maintenance.

In an embodiment, the equipment identifier may be used to uniquely identify an equipment profile to a handheld communicator or a user. Multiple configuration profiles may have similar or same equipment listed in an equipment profile for the same device. For example, a first technician may make a first adjustment using a first communicator, thereby generating a first equipment identifier and a corresponding equipment profile for a configuration. At a different time, a second technician may make a second adjustment using the first communicator thereby generating a second equipment identifier and equipment profile. The first and second configuration may be for the same process control device but have different equipment profiles and consequently different equipment identifiers. In an embodiment, when a query to a configuration database is made based on device identifier or device type with an equipment profile, it may be possible that multiple configuration profiles are outputted with the different partial equipment profiles. A factor in determining a desired partial equipment profile is user input at the handheld communicator. The described method and system may be used to identify or locate a configuration profile that is associated with particular set of equipment and where the configuration of the device is correlated to technician observed factors in the filed necessary to calibrate the process control device.

With reference to FIG. 8, the configuration profiles having equipment profiles and process identifiers may be used for cloud sharing applications. Generally a cloud sharing service or application is a service that provides simultaneous access for multiple users to a common set of file data in a public online database. In an embodiment, a central public data store that receives equipment profiles and process profiles cross-plant and cross-companies may be maintained for sharing configuration files to a larger group of plant operators or technicians. This central configuration database may contain a large number of configuration profiles to assist new process installations by locating appropriate configurations across a plurality of plants easily based on partial equipment profiles and process profiles. In an embodiment, equipment profiles and process profiles may be anonymized to maintain confidentiality of participant configuration data contributors.

In an embodiment, the equipment identifiers may be generated to be universally unique based on any number of techniques know in the art and based on, for example, process control device serial numbers, date-time values, random variables, etc. These equipment identifiers may be unique not just within a plant, but across plants and companies. In an embodiment, the configuration profiles may be stored with equipment profiles having the uniquely generated equipment identifiers. In this embodiment, a query for configuration data (e.g., configuration profiles) based on device and equipment profile may result in multiple configuration profiles having matching equipment profiles. In an embodiment, a handheld communicator may be programmed to determine whether an equipment profile was generated by the handheld communicator itself. The handheld communicator may determine this by keeping a record of equipment identifiers the handheld communicator has generated. Storing identifiers may take relatively small space compared to a complete configuration file or equipment profile. Alternatively, the handheld communicator may generate the uniquely based identifier based on proprietary encoding methods that a plant implements and the handheld communicator may be programmed to recognize those it encoded itself. In this embodiment, the handheld communicator may recognize its own device configurations and mark those configurations in a display. For example, when displaying a listing of configuration profiles resulting from a search of a larger public cloud sharing service, configurations belonging to the handheld communicator may be highlighted or otherwise indicated. In some embodiments, the handheld communicator be programmed to provide a user the option to record a name value or an alias for the configuration profile. For example, a technician generating a configuration profile may be able to name the configuration profile as "Mark's Filling Process Temp Sensor 3." In this embodiment, when the same handheld communicator retrieves a search result for configuration profiles, the communicator may display results that it generated using the user specific values displayed.

Additional data can be indexed to the configuration files based on plant or company organization. This additional data can be adapted to remain internal. For example, a plant or company may decide to encode additional plant specific proprietary metadata into its configuration files which may be used to identify internal plant or company data while still allowing a set of the configuration files to be cloud shared without the metadata, thereby maintaining contributor anonymity. In this manner, non-plant specific data can be shared to the cloud while plant specific data can be retrieved with the encoded equipment device identifiers.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., a server, a user interface device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A method of sharing plant device configuration data collected by a handheld communicator for a set of process control devices comprising:
    communicatively coupling a first handheld communicator to a first process control device to access a set of device parameters of the first process control device;
    modifying the set of device parameters of the first process control device using the first handheld communicator;
    generating a first configuration profile for the first process control device, wherein the first configuration profile includes a configuration identifier, a device identifier, a set of process control device parameters, and a date-time parameter, wherein a subset of the process control device parameters includes the set of device parameters modified by the first handheld communicator;
    assigning a set of relational identifiers including at least one equipment identifier to the first configuration profile, wherein the equipment identifier references at least a second process control device associated with the first process control device; and
    querying for the first configuration profile by the device identifier and the at least one equipment identifier to retrieve the first configuration profile.

2. The method of claim 1, wherein the at least one equipment identifier indexes an equipment profile stored in a memory of the first handheld communicator and wherein the equipment profile includes a device identifier of the second process control device.

3. The method of claim 2, wherein the at least one equipment identifier is generated by the first handheld communicator to be unique across configuration data collected from multiple plants.

4. The method of claim 1, further including generating an equipment profile indexed by the at least one equipment identifier, wherein the equipment profile includes an index of related process control devices that includes the first and the second process control device.

5. The method of claim 4, wherein the generating an equipment profile is performed by the first handheld communicator.

6. The method of claim 4, further including executing a process control segment diagnosis by the first handheld communicator and wherein generating the equipment profile is based on devices identified by the segment analysis while the first handheld communicator is coupled to the first process control device.

7. The method of claim 4, further including recording a detected device connection between the first process control device and the second process control device and generating the at least one equipment profile based on the detection, wherein the equipment profile indicates a set of equipment communicatively coupled to the first process control device including the second control device.

8. The method of claim 4, wherein the equipment profile devices are based on user inputs received at the first handheld communicator as part of a configuration process of the first process control device.

9. The method of claim 8, further including prompting a user at the first handheld communicator to confirm whether the first process control device is associated with an equipment profile of another device identifier in a memory of the first handheld communicator.

10. The method of claim 1, wherein assigning a set of relational identifiers includes assigning a process identifier to the configuration profile, wherein the process identifier indexes a process control profile, the process control profile including a set of attributes including at least the process identifier, an equipment profile, and a set of configuration profiles.

11. The method of claim 10, further including prompting a user at the first handheld communicator to confirm whether the first process control device is associated with a process identifier of another device stored in a memory of the first field communicator.

12. The method of claim 10, wherein assigning a set of relational identifiers to the first configuration profile is performed by the first handheld communicator prior to transmitting the first configuration profile to another device.

13. The method of claim 10, wherein the process identifier is manually entered by a user as part of a configuration process.

14. The method of claim 13, wherein the process identifier is indexed to a control loop module identifier.

15. The method of claim 1, wherein generating the first configuration profile includes encoding a plant specific identifier into the configuration identifier and further including displaying a retrieved set of configuration profiles at the first handheld communicator where configuration profiles containing the encoded plant specific identifier are displayed using a local plant alias assigned by the first handheld communicator.

16. A system for sharing plant device configuration data collected by handheld communicators for a plurality of process control devices comprising:
a first process control device including one of a set of devices including a process controller, an input/output interface, or a field device;
a first handheld communicator device detachably coupled to the first process control device and adapted to:
access a device parameter menu of the first process control device to execute a set of write commands to the first process control device;
generate a configuration profile capturing a set of device parameters of the field device, wherein the set of write commands modifies the set of device parameters of the first process control device; and
assign an equipment identifier to the configuration profile, wherein the equipment identifier indexes an equipment profile that includes a set of process control devices associated with the field device; and
a device configuration database adapted to receive the configuration profile from the handheld communicator and to store the configuration profile indexed by at least a device identifier and an equipment identifier.

17. The system of claim 16, further including a second handheld communicator communicatively coupled to a second process control device, wherein the second handheld communicator is further adapted to query for and retrieve the configuration profile from the device configuration database based on the device identifier and the equipment profile and to install the configuration profile on the second process control device.

18. The system of claim 16, further including a second handheld communicator directly coupled to the first handheld communicator and wherein the second handheld communicator is adapted to query for and retrieve the configuration profile by transmitting a request to the first handheld communicator for a list of configuration profiles associated with a device identifier and an equipment identifier.

19. The system of claim 18, further including downloading the queried configuration profile from the first handheld communicator to the second handheld communicator and automatically installing process control device parameters of the configuration profile to a second process control device communicatively coupled to the second handheld communicator.

20. The system of claim 16, wherein the handheld communicator is further adapted to assign a process identifier to the configuration profile.

21. The system of claim 16, wherein the handheld communicator is further adapted to encode a plant specific identifier into the configuration identifier.

22. The system of claim 21, wherein the handheld communicator is further adapted to recognize the plant specific identifier and to display an alias value when the configuration profile is retrieved by the handheld communicator in lieu of a default configuration identifier value.

23. The system of claim 16, wherein the device configuration database is hosted by a cloud server.

24. The system of claim 23, further including a plant workstation communicatively coupled to the device configuration database and the cloud server and adapted to recognize plant encoded configuration identifiers and to forward the configuration profile to the cloud server after removing the plant specific encoding in the configuration identifiers.

25. A computing device for use in configuring a plant device comprising:
a computer readable memory;
a processor;
a first interface communicatively connected to a first process control device, wherein the first interface is detachable from the first process control device,
wherein a configuration application is stored on the computer readable memory and adapted to be executed on the processor to:
communicate with the first process control device via the first interface to access a set of device parameters of the first process control device;

modify the set of device parameters of the first process control device;

generate a first configuration profile for the first process control device, wherein the first configuration profile includes a configuration identifier, a device identifier, a set of process control device parameters, and a date-time parameter, wherein a subset of the process control device parameters includes the set of device parameters modified by the configuration application;

assign at least one equipment identifier to the first configuration profile, wherein the equipment identifier references at least a second process control device associated with the first process control device; and query for the first configuration profile by the device identifier and the at least one equipment identifier to retrieve the first configuration profile.

26. The computing device of claim 25, wherein the configuration application is further adapted to assign a process identifier to the first configuration profile, wherein the process identifier indexes a process control profile, the process control profile including a set of attributes including the process identifier, an equipment profile, and a set of configuration profiles.

* * * * *